United States Patent
Wegmann et al.

(10) Patent No.: US 10,009,806 B2
(45) Date of Patent: Jun. 26, 2018

(54) OPTIMIZING A HANDOVER BEHAVIOR OF A MOBILE RADIO COMMUNICATION NETWORK BASED ON AN EXTENDED REPORT MESSAGE COMPRISING INFORMATION ABOUT A PERFORMED HANDOVER

(75) Inventors: Bernhard Wegmann, Holzkirchen (DE); Ingo Viering, Munich (DE); Dirk Rose, Munich (DE); Krzysztof Kordybach, Pulawy (PL)

(73) Assignee: Nokia Solutions and Networks Oy, Espoo (FI)

( * ) Notice: Subject to any disclaimer, the term of this patent is extended or adjusted under 35 U.S.C. 154(b) by 0 days. days.

(21) Appl. No.: 14/238,023

(22) PCT Filed: Aug. 11, 2011

(86) PCT No.: PCT/EP2011/063827
§ 371 (c)(1),
(2), (4) Date: Feb. 10, 2014

(87) PCT Pub. No.: WO2013/020599
PCT Pub. Date: Feb. 14, 2013

(65) Prior Publication Data
US 2014/0206360 A1  Jul. 24, 2014

(51) Int. Cl.
*H04W 36/00* (2009.01)
*H04W 24/04* (2009.01)
*H04W 36/08* (2009.01)

(52) U.S. Cl.
CPC ....... *H04W 36/0083* (2013.01); *H04W 24/04* (2013.01); *H04W 36/0005* (2013.01); *H04W 36/08* (2013.01)

(58) Field of Classification Search
CPC ............................ H04W 36/00; H04W 36/20
See application file for complete search history.

(56) References Cited

U.S. PATENT DOCUMENTS

| 2009/0154397 A1* | 6/2009 | Akhtar | H04L 47/782 370/328 |
| 2010/0173633 A1* | 7/2010 | Catovic et al. | 455/436 |

(Continued)

FOREIGN PATENT DOCUMENTS

EP   2 291 028 A1   3/2011

OTHER PUBLICATIONS

3GPP TR 36.902 V9.3.1 (Mar. 2011): 3rd Generation Partnership Project; Technical Specification Group Radio Access Network; Evolved Universal Terrestrial Radio Access Network (E-UTRAN); Self-configuring and self-optimizing network (SON) use cases and solutions (Release 9) (21 pages).

(Continued)

*Primary Examiner* — Justin Lee
(74) *Attorney, Agent, or Firm* — Harrison & Smith

(57) ABSTRACT

A method includes optimizing a handover behavior of a mobile radio communication network including at least a first base station and a second base station. The method includes (a) performing a handover of a UE from the first base station to the second base station; (b) adding an information element representing a property of the UE to a report message including information about the performed handover; (c) forwarding the report message from the second base station to the first base station; and (d) optimizing the handover behavior of the mobile radio communication network based on the added information element. Further, it is described a base station which is configured for carrying out the described handover behavior optimization method.

17 Claims, 2 Drawing Sheets

(56) References Cited

U.S. PATENT DOCUMENTS

| | | | |
|---|---|---|---|
| 2013/0183960 A1* | 7/2013 | Olofsson | H04W 24/08 455/423 |
| 2014/0024374 A1* | 1/2014 | Bergman et al. | 455/436 |
| 2014/0148174 A1* | 5/2014 | Teyeb | H04W 36/0083 455/441 |

OTHER PUBLICATIONS

3GPP TS 36.331 V10.2.0 (Jun. 2011); 3rd Generation Partnership Project; Technical Specification Group Radio Access Network; Evolved Universal Terrestrial Radio Access (E-UTRA): Radio Resource Control (RRC); Protocol specification (Release 10) (294 pages).

3GPP TSG-RAN WG3 Meeting #66, Jeju Island, South Korea, Nov. 9-13, 2009, R3-093380, "Introduction of Handover Report Procedure", Huawei, et al., 14 pgs.

3GPP TSG RAN WG3 Meeting #68, Montreal, Canada, May 10-14, 2010, R3-101643, "Goal of Multi-RAT Mobility Robustness optimization", Nokia Siemens Networks, 3 pgs.

3GPP TSG-WG3 Meeting #71, Taipei, Taiwan, Feb. 21-25, 2011, R3-110998, "Correction to usage of Handover • Report for MRO", NEC, et al., 5 pgs.

3GPP TSG-RAN WG3 Meeting #72, Barcelona, Spain, May 9-13, 2011, R3-111241, "Capture the agreed MRO mechanism in stage 2", Samsung, 4 pgs.

3GPP TR 36.902 V9.3.0 (Dec. 2010), "$3^{rd}$ Generation Partnership Project; Technical Specification Group Radio Access Network; Evolved Universal Terrestrial Radio Access Network (E-UTRAN); Self-configuring and self-optimizing netwak (SON) use cases and solutions (Release 9)", 21 pgs.

3GPP TS 23.203 V12.3.0 (Dec. 2013), "$3^{rd}$ Generation Partnership Project; Technical Specification Group Services and System Aspects; Policy and charging control architecture (Release 12)", 215 pgs.

"RLF Reports for Mobility Robustness Optimization, R3-091357", Nokia Siemens Networks, 3GPP TSG RAN WG3 Meeting #64, May 2009, 5 pgs.

* cited by examiner

OPTIMIZING A HANDOVER BEHAVIOR OF A MOBILE RADIO COMMUNICATION NETWORK BASED ON AN EXTENDED REPORT MESSAGE COMPRISING INFORMATION ABOUT A PERFORMED HANDOVER

FIELD OF INVENTION

The present invention relates to the field of controlling handovers of user equipments within mobile radio communication networks. In particular, the present invention relates to a method for optimizing a handover behavior of a mobile radio communication network comprising at least a first base station and a second base station. Further, the present invention relates to a base station which in conjunction which at least one other base station of the mobile radio communication network is configured for carrying out the described handover behavior optimization method.

ART BACKGROUND

One important area in the technical field of mobile radio communications relates to the handover (HO) of User Equipment (UE) from a (serving) source cell to a (neighboring) target cell and the optimization of parameters controlling the HO. In this technical field Self Optimizing Networks (SON) and in particular Mobility Robustness Optimization (MRO) are objects of high interest.

Traditionally, the optimization of network configuration parameters in 2G or 3G mobile radio communication networks is based on labor- and cost-intensive drive testing. For a first roll-out, network-wide default configuration parameters are used and if performance management (PM) counters are accumulating Radio Link Failures (RLFs) or even call drops in certain service areas, several optimization loops with drive testing equipment have to be accomplished in order to adapt parameters in a proper and cell-specific manner.

The object of MRO is to automate the optimization of those network configuration parameters, which are triggering a HO, such that first and foremost Radio Link Failures (RLFs) and HO failures (HOF) are reduced and secondly also unnecessary HOs like (a) so called ping pong HOs, which occur in particular if a UE is located within a border region between two base stations, and/or (b) so called short stays of a UE with a certain base station (BS) are prevented.

HO problems which might even cause RLFs may occur in case the HO thresholds being used have inappropriate values. 3GPP has specified three different categories of HO problems which may cause a RLF:
  (a) Failures due to too late HO triggering
  (b) Failures due to too early HO triggering
  (c) Failures due to HO to a wrong cell A MRO procedure typically consists of two phases: A Root Cause Analysis (RCA) phase and a correction phase. In a RCA phase all information which is needed in order to analyze a mobility problem is brought together in order to generate corresponding cell or cell-pair specific statistics of Key Performance Indicator (KPI). In a correction phase based on the KPI statistics appropriate countermeasures are determined and measurement parameters triggering a HO are adjusted accordingly.

There may be a need for improving the handover behavior of a mobile radio communication network.

SUMMARY OF THE INVENTION

This need may be met by the subject matter according to the independent claims. Advantageous embodiments of the present invention are described with the dependent claims.

According to a first aspect of the invention there is provided a method for optimizing a handover behavior of a mobile radio communication network comprising at least a first base station and a second base station. The provided method comprises (a) performing a handover of a user equipment from the first base station to the second base station; (b) adding an information element representing a property of the user equipment to a report message comprising information about the performed handover; (c) forwarding the report message from the second base station to the first base station; and (d) optimizing the handover behavior of the mobile radio communication network based on the added information element.

The described handover (HO) behavior optimization method is based on the idea that by adding the described information element being indicative for a property of the User Equipment (UE) to the report message comprising information about the performed handover the mobile radio communication network will be able to optimize its HO behavior for future HOs. As a consequence, future HOs might be triggered earlier or later as compared to HO trigger events which are generated before the described handover behavior optimization has been completed. Thereby, the property of the UE may be a (radio) property which is given and/or which is experienced by the UE in particular during but also shortly before and/or shortly after the HO.

In accordance with current 3GPP LTE standards the described report message may by the HO Report message which already contains information about (a) the type of the HO Report, i.e. whether the HO was a too early HO or an HO to a wrong cell, (b) the HO cause, i.e. the reason for the initiated HO, which was successful, and (c) E-UTRAN Cell Global Identification (ECGI) of the first (source) base station, of the second (target base station) being associated with the failed cell and (c) the base station respectively the cell where a reestablishment of the radio link between the UE and the mobile radio communication network occurred. Of course, also this information can be taken into account in addition to the described added information element in order to optimize the HO behavior of the mobile radio communication network.

Descriptively speaking, by adding further relevant information to an already known HO Report procedure more detailed information will be available e.g. for the first BS and/or for any other network entity being connected directly or indirectly with the first BS in order to appropriately adapt network configuration parameters such that the HO behavior of the mobile radio communication network can be improved.

The extended report message described in this document may be transferred from the second BS to the first BS via a so called X2 interface between the two BSs. This may provide the advantage that in case the above described method is carried out within an LTE network, a standardized interface between eNodeBs, which already exists, can be employed. This means that the described HO behaviour optimization method can be easily realized in known mobile radio communication networks without having the need to modify the corresponding network architecture. Of course, in case an X2 interface is used, the structure of the report message must comply with the standardized X2 requirements.

The UE may be any type of communication end device, which is capable of connecting with an arbitrary communication network access point (e.g. the two base stations (BSs)). In particular the UE may be a cellular mobile phone, a Personal Digital Assistant (PDA), a tablet computer, a notebook computer and/or any other movable radio communication device.

According to a further embodiment of the invention optimizing the handover behavior comprises (a) adapting the value of at least one handover radio threshold for triggering a handover of the user equipment between different base stations because of radio link conditions being experienced by the user equipment and/or (b) adapting the value of at least one traffic steering parameter for changing the distribution the radio data load between different radio cells of the mobile radio communication network.

This may provide the advantage that the HO behavior of the mobile radio communication network can be effectively optimized by known and comparatively simple measures. Specifically, if for instance a problematic HO was triggered because of the (changing) radio link conditions of a (moving) UE it may be advantageous not to modify the traffic steering parameter(s). Correspondingly, if a problematic HO was triggered (mainly) because of traffic steering reasons the value(s) of the corresponding traffic steering parameter(s) was probably set too aggressive, it might be a good idea to leave the HO radio thresholds unchanged.

In this respect it is mentioned that traffic steering might be accomplished because of different reasons. One reason may be that the source cell suffers from a high radio data load whereas at the same time the target cell has to handle only a comparatively small radio data load. In order to balance the radio data load it may be advantageous to hand over at least one UE, which is preferably located within a border region between the source cell and the target cell, from the source cell to the target cell. In this case the motivation for radio data traffic steering is a radio data balancing.

Another reason for accomplishing traffic steering might be that although the radio conditions for a UE within a source cell are good a HO to a target cell might make sense if, e.g. because of different RATs, the target cell can handle a higher radio data rate being requested by the user of the UE. Such a higher radio data rate may be requested for instance if the user of the UE wants to participate in a video conferencing session.

It is explicitly mentioned that there may be also other reasons or motivations for a traffic steering procedure.

According to a further embodiment of the invention the property of the user equipment is a radio property, in particular a radio property during and/or within a predetermined time period after the performed handover. This may provide the advantage that further detailed information about the radio conditions of the UE will be provided to the first BS and/or to any other network entity being connected directly or indirectly with the first BS in order to appropriately adapt network configuration parameters based inter alia on the UE radio property.

The predefined time period may be e. g. 20 seconds, 10 seconds, 5 seconds or 2 seconds.

According to a further embodiment of the invention the radio property of the user equipment is determined by the type of at least one measurement event which has been responsible for triggering the performed handover. This may provide the advantage that more information about the HO will be captured and a further improvement of the HO behavior of the mobile radio communication network may be possible.

Depending on the type of HO (e.g. an inter RAT or an intra RAT) different measurement types may have been used and corresponding information may be included in the information element and/or in the further information element.

For instance an intra RAT HO between two Long Term Evolution (LTE) base stations (i.e. eNodeBs) may have been triggered by a measurement report which is sent from the UE to its serving BS. The measurement report from the UE to its serving BS in turn may have been triggered by a so called A3 measurement. Thereby, it is only checked whether one single condition like for instance a predefined signal strength offset between (a) the UE and the source BS and (b) the UE and the target BS is fulfilled. If this is the case the intra LTE HO is triggered as described above.

Another example for a measurement event triggering an intra RAT (in particular intra LTE) HO is the so called A5 measurement event. With an A5 measurement it is determined whether two different conditions are fulfilled before an HO trigger is released. Specifically, by means of an A5 measurement it is determined whether (a) the signal strength between the source (first) BS and the UE is smaller than a first threshold and (b) the signal strength between the target (second) BS and the UE is larger than a second threshold. Generally speaking, before a HO trigger is released two measurement values are compared with two different threshold values, wherein respectively one measurement value is assigned to one threshold value.

For instance an inter RAT HO may have been triggered by a so called B1 measurement report. A B1 event is given when the signal strength of a neighboring (target) cell of a different RAT is larger than a predefined threshold.

Another example for a measurement event triggering an inter RAT HO is the so called B2 measurement event, which is only given if two conditions are fulfilled. Specifically, a first condition is fulfilled if the signal strength from the serving (first/source) BS becomes worse than a first threshold "B2-1" and the signal strength from the neighboring (second/target) BS becomes better than a second threshold "B2-2". Only if these conditions are fulfilled a corresponding measurement report will be sent and in response thereto an inter RAT HO trigger will be released.

It is mentioned that the above given enumeration of measurement events is not exclusive and the information element and/or the further information element may be indicative also for other measurements events which are specified e.g. in the technical specification 3GPP TS 36.331.

According to a further embodiment of the invention the property of the user equipment is determined by the Quality of Service which has been enjoyed by the user equipment before, during and/or after the handover.

The Quality of Service (QoS) could be specified for instance by QoS Class Indicator (QCI) values as defined for instance in the 3GPP Technical Specification 23.203. Thereby, it may be distinguished for instance whether the user of the UE has enjoyed a Real Time (RT) or a non Real Time (nRT) service. A further useful distinction may be for instance whether (a) the user of the UE has enjoyed a Guaranteed Bit Rate (GBR) of e.g. 512 kbps (512 kilo bits per second) or (b) a non GBR or so called best effort radio data traffic. Such a distinction may be in particular useful because it is essential for service providers to ensure that their GBR users can always enjoy their GBR. Descriptively speaking: The GBR users should get what they have paid for.

It is mentioned that the above given distinctions are not exclusive and that the (further) information element being added to the report message may include any other distinction which from a technical point of view makes sense in order to learn more about the current HO behavior of the mobile radio communication network.

According to a further embodiment of the invention the property of the user equipment is the presence or the absence of a radio link failure of the radio link between the user equipment and the second base station. This may provide the advantage that an in particular important quality information about the HO can be provided to the first BS, which may be responsible for a radio link failure (RLF) e.g. because of a too early HO or a HO to a wrong cell.

According to a further embodiment of the invention the property of the user equipment is determined by the location of the user equipment during the handover. This may provide the advantage that specific spots, where after a successful HO a problem with the radio link between the UE and the second (target) BS occurs, can be identified and special location sensitive measures for improving the HO behavior of the mobile radio communication network can be applied. Thereby, the problem with the radio link may be a RLF after a successful but e.g. unnecessary HO or a short stay of the UE with the second (target) BS before a further HO of the UE to a third BS or back to the first BS (ping-pong HO) is carried out.

The location of the UE may be determined e.g. by means of a Global Positioning System (GPS), by means of an Assisted Global Positioning System (A-GPS) and/or by means of a configured location identifier such as for instance a particular street.

The location of the UE could also be derived from other known measurement principles such as for instance a location finding based on Wireless LAN networks, a location finding based on the so called Observed Time Difference of Arrival (OTDA) procedure and/or from a so-called RF fingerprint which is given by a combination of signal strength measurements of different surrounding base stations.

Further, the location of the UE could be derived from a set of Received Signal Received Power (RSRP) measurements (signal strength measurements) which has been recorded before the UE was lost, or which has been received via the RLF indication message. In this respect it is mentioned that the RLF indication message may contain results of measurements which have been accomplished before the RLF occurred.

Furthermore, the third BS may add UE location information to the RLF indication sent to the second BS. The location information may also be introduced to the report message by means of location ID(s). Such a location ID could be reported instead of a pure location information and the report message would then refer to "location 1", "location 2", "location 3", etc.

According to a further embodiment of the invention the first base station is assigned to a first radio access technology and the second base station is assigned to a second radio access technology, wherein the second radio access technology is different from the first radio access technology. This may mean that the described HO behavior optimization method can also be accomplished in connection with inter Radio Access Technology (RAT) HOs.

At this point it is mentioned that it is not essential that the UE HO is a inter RAT HO. Of course, the described method can also be accomplished in connection with intra RAT HOs.

At this point it is further mentioned that in case of an inter-RAT HO there is no X2 interface between the first (source) BS and the second (target) BS. Therefore, in case of an inter-RAT HO another interface between the involved BSs has to be used such as e.g. a RAN Information Management (RIM) procedure.

According to a further embodiment of the invention a first radio link between the user equipment and the first base station is assigned to a first radio frequency and a second radio link between the user equipment and the second base station is assigned to a second radio frequency, wherein the second radio frequency is different from the first radio frequency. This may mean that the described HO behavior optimization method can also be accomplished in connection with inter frequency HOs. Thereby, the two BSs may be assigned to the same RAT or alternatively to different RATs.

According to a further embodiment of the invention the method further comprises (a) determining a value of a parameter being indicative for a quality of the performed handover; and (b) if the determined value is smaller than a predefined threshold value, the steps of adding the information element, forwarding the report message and optimizing the handover behavior are carried out. This may provide the advantage that the (additional) information element will only have to be added to the described report message, which may be the known 3GPP HO Report message, if the HO has been successful but problematic.

The parameter being indicative for the performed HO may be described by a value representing the occurrence or the non-occurrence of a Radio Link Failure (RLF) after the HO, in particular a RLF in the radio link between the UE and the second base station (BS). Further, in case of an unnecessary HO the value of the parameter being indicative for the performed HO may be e.g. the period of time during which the UE has been served by the second BS before the UE is handed over to a third BS or back to the first BS. Thereby, a short stay of the UE with the second BS may be an evidence that the HO of the UE from the first BS to the second BS was performed too early, too late and/or was a HO to a wrong (target) cell or BS.

Generally speaking, a HO may be considered as to be problematic (i.e. the determined HO quality value is smaller than the predefined threshold value) if there occurs a RLF between the UE and the second BS within a comparatively short time interval after the HO has been completed. Another example for a problematic HO may be e.g. a too early HO or a HO to a wrong cell, which after a short stay of the UE with the second BS requires a further HO of the UE to a further (third) BS or back to the first BS.

According to a further embodiment of the invention the method further comprises (a) losing a radio connection between the user equipment and the second base station; (b) establishing a radio connection between the user equipment and a third base station; and (c) sending a Radio Link Failure indication message from the third base station to the second base station. Thereby, the information element comprises at least some information from the radio link failure indication message. This may provide the advantage that information being included in the Radio Link Failure (RLF) indication message, which in accordance with known 3GPP standard procedures is transmitted from the third BS to the second BS, can be added to the report message. As a consequence, the described HO behavior optimization method can be made even more reliable.

It is mentioned that in accordance with known 3GPP standard procedures the RLF indication message is normally used by the third BS to make the second BS responsible for the RLF. However, in the radio scenario described here not the second BS but the first BS may be responsible for the RLF e.g. because of a too early HO and/or a HO to a wrong cell (e.g. the third and not the second BS should have been the target BS of the performed HO). Therefore, by forwarding the corresponding information of the RLF indication message from the second BS to the first BS the first BS can be made responsible for the RLF and appropriate countermeasures can be taken in order to avoid such "bad quality" HOs in the future.

In general, the second BS could add any information to the report message, which has been received from the described RLF indication message. More specific, the RLF indication message may contain the "RLF Report" which the UE may send to the third BS and which reports to the third BS that it has suffered from an RLF. In accordance with 3GPP specifications this "RLF Report" already contains a set of Reference Signal Received Power measurements, which also could be used for improving the handover behavior optimization procedure.

It is mentioned that also other combinations in consideration of e.g. timing advance information, signal strength information, etc. are possible.

According to a further embodiment of the invention the method further comprises adding, by the second base station, at least some information obtained from a data record which has been associated with the user equipment before the radio connection between the user equipment and the second base station has been lost and which is still stored in the second base station, to the report message. Thereby, for optimizing the handover behavior of the mobile radio communication network at least some of the added information is taken into account.

The data record may be a (UE) history file wherein any number of radio link properties can be stored, which have been enjoyed by the UE in the past before one of a plurality of HOs has been accomplished. Further, the data record may be the so called UE context, wherein in accordance with 3GPP standards information about the radio link between the UE and the corresponding base station is stored. This information may include for instance the radio frequency, the polarization of the radio waves extending between the UE and the base station, an identification of the UE, an identification of the corresponding base station, information about the currently employed encryption etc.

Descriptively speaking, according to the embodiment described here additional details about the initiated and performed HO and the affected UE along with an already existing report message comprising information about a performed handover are provided. Specifically, after the first BS has initiated a "poor quality" but successful HO of the UE to the second BS, the UE may suffer an RLF within the second cell being associated to the second BS. Afterwards, the UE may re-establish or re-connect to the third BS which in accordance with known 3GPP specifications sends an RLF indication to the second BS and the second BS sends a report comprising information about the performed handover to the first BS. Since the second BS still has the (UE) history file and/or the UE context file available, which is associated with the UE, the second BS can associate the correct (UE) history/context file to the received RLF indication message. Hence, the second BS is able to "remember" plenty of details of the affected HO and the affected UE. For instance the second BS knows the service which the UE was using. Further, the second BS may have some location information before the UE was lost. This could be pure timing advance, GPS/A-GPS, or any other positioning information (in particular if minimization of the above mentioned Drive Tests is applied).

In accordance with the embodiment of the invention described here the second BS adds such kind of information to the report message which signaled to the first BS in particular via an X2 interface.

According to a further embodiment of the invention the third base station and the first base station are the same. This may provide the advantage that in particular so called multiple ping-pong HO which may be caused by a too early HO of the UE from the first BS to the second BS and which do not lead to a RLF or even a complete call drop but which cause unnecessary high signaling load can be taken into account for optimizing the handover behavior of the mobile radio communication network. As a consequence, the HO behavior of the mobile radio communication network can be improved in particular with respect to unnecessary ping-pong HOs and the overall signaling overload within the mobile radio communication network can be reduced.

It is pointed out that a ping-pong HO is a very common phenomenon which is responsible for degrading the performance of a mobile radio communication network. Specifically, a ping-pong handover is a frequent HO to and from two cells of a cell pair. The ping-pong effect may occur due to a frequent movement of the UE between the respective cell pair and/or due to comparatively high signal fluctuation at a common boundary of the cell pair. Also too aggressive radio data traffic steering parameters may be the reason for ping-pong HO. Since the ping-pong HO increases the times of HO and thus the loading of the network, it is important for network operators to reduce this undesirable effect.

According to a further aspect of the invention there is provided a base station for a mobile radio communication network for optimizing a handover behavior of the mobile radio communication network. The base station comprises (a) a handover control unit for controlling a handover of a user equipment from another base station of the mobile radio communication network to the base station; (b) a data processing unit for adding an information element representing a property of the user equipment to a report message comprising information about the performed handover; and (c) a transmitting unit for forwarding the report message from the base station to the other base station. Thereby, based on the information element added to the report message the base station is arranged for optimizing the handover behavior of the mobile radio communication network.

Also the described BS is based on the idea that by adding the described information element being indicative for a property of the UE to the report message the mobile radio communication network will be able to optimize its HO behavior for future HOs. As a consequence, future HOs might be triggered earlier or later as compared to HO trigger events which are generated before the described handover behavior optimization has been completed.

According to a further aspect of the invention there is provided a computer program for optimizing the handover behavior of a mobile radio communication network. The computer program, when being executed by a data processor, is adapted for controlling and/or for carrying out the handover behavior optimization method as described above.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
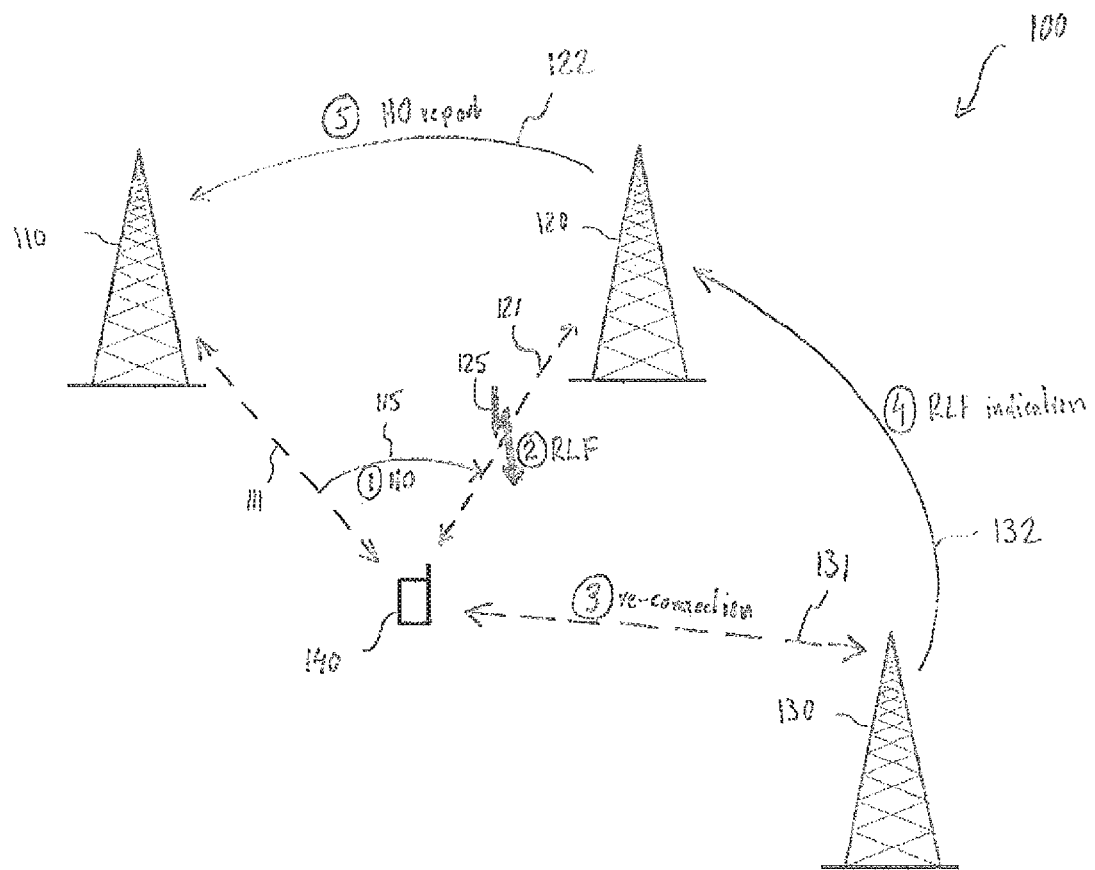
FIG. 1 shows a mobile radio communication network comprising three base stations, wherein a second base station is configured for forwarding an extended Handover Report message to a first base station after a radio link failure has occurred with a radio link between a user equipment and the second base station.

The illustration in the drawing is schematically. It is noted that in different figures, similar or identical elements are provided with reference signs, which are different from the corresponding reference signs only within the first digit.

The basic idea of the handover (HO) behavior optimization method described in this document is to provide additional details about an initiated HO and the affected user equipment (UE) along with a report message comprising information about the performed handover. According to the embodiment described here the report message is the HO Report message, which is already known in 3GPP standard specifications.

In the following reference is made to FIG. 1 which shows a mobile radio communication network 100 comprising a UE 140 and three base stations (BS), a first BS 110, a second BS 120 and a third BS 130. According to the embodiment described here the mobile radio communication network 100 is a Long Term Evolution (LTE) network, wherein the BSs are typically denominated eNodeBs.

In the radio scenario illustrated in FIG. 1, initially the UE 140 is connected to the first BS 110 via a first radio link 111. At a certain time the first BS 110 initiates a HO of the UE 140 to the second BS 120. After the HO the UE 140 is connected to the second BS 120 via a second radio link 121. In the following it is assumed that the HO, which is illustrated in FIG. 1 by the arrow 115, is a successful but "problematic" or "bad" HO.

In this document a HO is considered as to be problematic if the HO has been triggered too early, too late or is a HO to a wrong (target) cell, which, after a short stay of the UE 140 with the second (target) BS 120, requires a further HO of the UE 140 to a further (third) BS 130 or back to the first BS 110. Another cause why the HO is considered as to be problematic is if shortly after the HO has been completed a Radio Link Failure (RLF) 125 of the second radio link 121 occurs. The latter is the radio scenario illustrated in FIG. 1.

After having suffered the RLF 125 the UE 140 reconnects or re-establishes a radio connection 131 to the third BS 130. After successfully having radio collected the UE 140, in accordance with current 3GPP standard specifications the third BS 130 sends a so called RLF indication message 132 to the second BS 120 in order to inform the BS 120 that it has lost the UE 140. Based on this information the BS 120 can decide whether itself (i.e. the BS 120) was responsible for the RLF 125 (in particular because of a problematic HO) or whether the BS 120 considers another BS as to responsible for the RLF 125. However, in the scenario described here, the second BS 120 is not guilty because the first BS 110 is responsible for the problematic HO 115.

In accordance with an embodiment of the invention the second BS 120 sends an extended HO Report message 122, which in addition to the usual information contained in a known HO Report message further comprises information representing a property of the UE 140.

This further information may be e.g. service information about the type of radio service the UE 140 has enjoyed before, during and/or immediately after the HO 115. This further information may also be location information of the UE, i.e. at which location the UE 140 was situated at the time the bad or problematic HO 115 has been accomplished.

The service information may be characterized for instance by the "QoS Class Indicator" as defined in 3GPP TS 23.203. Alternatively, a more coarse distinction of the service type is possible, such as Real-Time or Non-Real Time, or Guaranteed Bit Rate (GBR) and non-GBR.

The location information may consist of GPS coordinates. Alternatively, the location information could consist of a set of Reference Signal Received Power (RSRP) measurements (signal strength) which has been recorded before the UE 140 was lost, or which has been received via the RLF indication message 132. In this respect it is noted that the RLF indication message 132 may contain measurements preceding the RLF 125.

Furthermore, the third BS 130 may have added location information to the RLF indication message 132, which could also be used in order to extend the HO Report message 122. In general, the second BS 120 could add any information to the HO Report message 122, which has been received via the RLF indication message 132. More specific, the RLF Indication message 132 may contain the "RLF Report" which the UE 140 may send to the third BS 130 after the RLF 125. This "RLF Report" already contains a set of RSRP measurements.

Another idea for location information is to introduce a location ID. Such an ID could be used instead of the pure location information and the extended HO Report message 122 would then refer to location 1, location 2, location 3, etc.

It is mentioned that at the time the second BS 120 receives the RLF indication message 132 the second BS 120 has still available the so called UE context information and can associate the correct UE context information to the RLF indication message 132. Hence, the second BS 120 is able to "remember" plenty of details of the affected HO and the affected terminal. For instance: The second BS 120 knows the service which the UE was using. Further, the second BS 120 may have some location information before the UE 140 was lost. This could be pure timing advance, GPS/A-GPS, or any other positioning information (in particular if Minimization of Drive Tests is applied).

In the following some advantages with respect to an extended HO Report message containing a Quality of Service (QoS) information will be described:

Under certain circumstances, a certain group of users might be more sensitive against ping-pong HOs than other groups, and at the same time less sensitive against RLFs. For instance, in an inter-RAT HO case (e.g. a HO from an LTE eNodeB to a UMTS BS), web browsing users might be quite sensitive against ping-pong HOs. Note that packet forwarding is not mandatory during an inter-RAT HO, so that packets may get lost on lower layers of the Open Systems Interconnection Reference Model and require higher-layer retransmissions. In case of an inter-RAT ping-pong HO (i.e. a concatenation of HOs between two BSs of different RATs), this effect gets significant and will lead to a significant degradation of the throughput. Therefore, for Non Real Time services, which require a rather low packet error rate, ping-pong HOs are as critical as RLFs and should treated as serious as RLFs by a Mobility Robustness Optimization (MRO) scheme. Other services may behave differently. For instance, voice users show the opposite behavior. A RLF may lead to a call drop, whereas the packet loss rate during a ping-pong HO is still acceptable for the voice call, since there is no higher layer re-transmission and the good integration capability of the human ear. With the extended HO Report message described here the first BS and/or any other network entity being connected directly or indirectly with the first BS can take into account the QoS information in order to adapt network configuration parameters such that the HO behavior of the mobile radio communication network will be improved.

In the following some advantages of an extended HO Report message containing an UE location information will be described with reference to FIG. 2.

Figure 2:
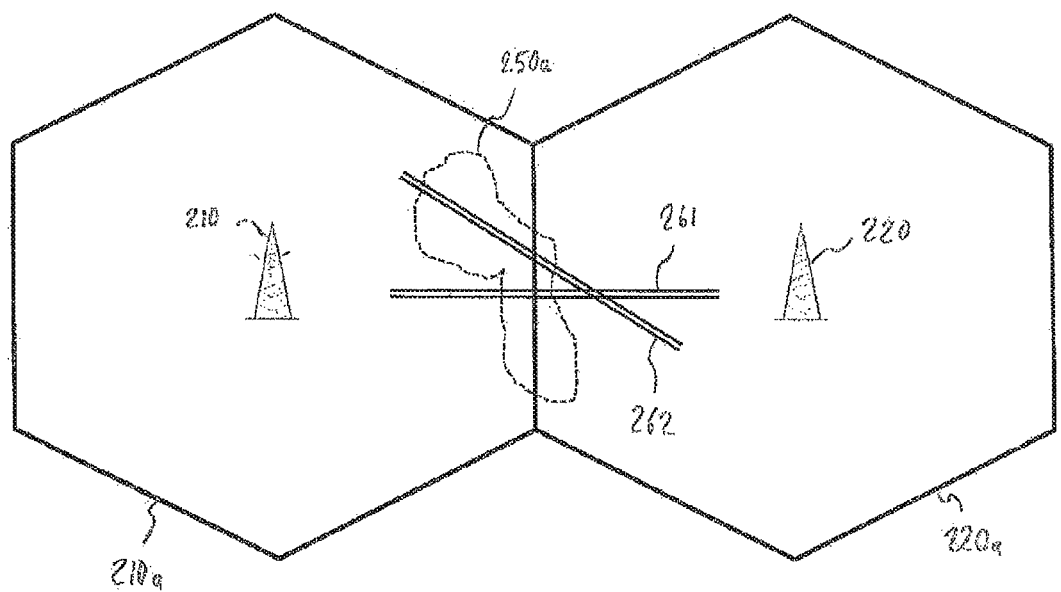
FIG. 2 shows two adjacent cells of a mobile radio communication network, wherein two different streets run across a cell border between these two cells.

FIG. 2 shows two adjacent cells of a mobile radio communication network 200. A first cell 210*a* is assigned to a first BS 210 and a second cell 220*a* is assigned to a second BS. In the embodiment shown in FIG. 2 it is assumed that both BSs 210 and 220 operate with the same carrier frequency.

According to the embodiment described here a boundary between the two cells is crossed by two different streets, a first street 261 and a second street 262. That is, the vast majority of the users will cross the cell boundary on two different locations (the intersection between the respective street and the cell boundary). Further, in the border region between the two cells 210*a* and 220*a* there is a spatial irregular area 250*a* where the signal strength of two neighboring base stations is quite similar (e.g. within 3 dB). As can be seen from FIG. 2, the first street 261 has a comparatively small spatial overlap with the area 250*a* whereas the second street 262 has a comparatively large spatial overlap with the area 250*a*.

Descriptively speaking, since the radio propagation conditions are typically totally different on those two streets UE users may suffer from different types of mobility problems. For instance, a HO location which is situated on the first street 261 might be governed by a very steep pathloss/shadowing slope which may lead to "too late" HO problems (i.e. the HOs should be initiated more early). Another HO location which is situated on the second street 262 might be governed by flat shadowing and thereby a broad area where both cells have very similar signal strengths. This may more likely induce ping-pong HOs (i.e. those users would benefit from triggering HO later).

Based on these descriptive examples it can easily been understood that for optimizing the HO behavior of the mobile radio communication network 200 it will be helpful (a) to count the mobility problems separately for each location, (b) to optimize different HO parameters for each location and/or (c) to signal the different parameter sets to the users, depending on their location.

With the extended HO Report message described here the first BS 210 (and/or any other network entity being connected directly or indirectly with the first BS can take into account such collected location specific HO information in order to adapt network configuration parameters such that the HO behavior of the mobile radio communication network 200 will be improved.

Figure 3:
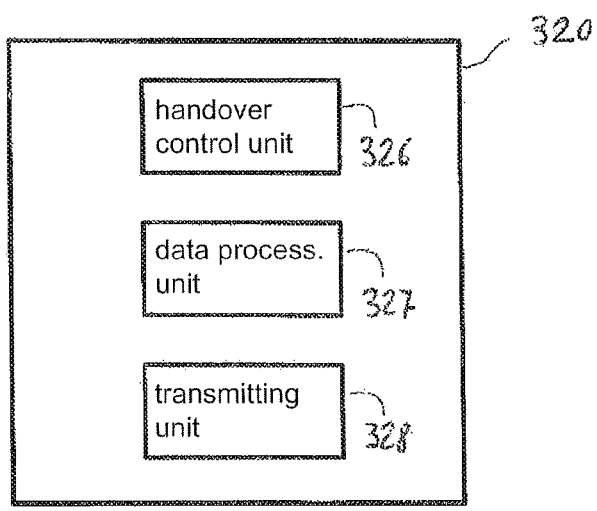
FIG. 3 shows a second (target) base station for a mobile radio communication network for optimizing the handover behavior of the mobile radio communication network.

FIG. 3 shows a second base station 320 for a mobile radio communication network for optimizing the handover behavior of the mobile radio communication network.

The second base station 320 comprises (a) a HO control unit 326 for controlling a HO of a UE from a first BS of the mobile radio communication network to the second BS 320, (b) a data processing unit 327 for adding an information element representing a property of the UE to a report message comprising information about the performed handover; and (c) a transmitting unit 328 for forwarding the report message from the second BS 320 to the mentioned first base station. Thereby, based on the information element added to the HO report message the HO behavior of the mobile radio communication network can be optimized.

It is noted that it may also be possible in further refinements of the invention to combine features from different illustrative embodiments described herein. It should also be noted that reference signs in the claims should not be construed as limiting the scope of the claims.

LIST OF REFERENCE SIGNS

100 mobile radio communication network
110 first base station/first eNodeB
111 first radio link between UE and first BS (before HO)
115 "bad" handover (HO)
120 second base station/second eNodeB
121 second radio link between UE and second BS (after HO)
122 HO Report message
125 radio link failure
130 third base station/third eNodeB
131 third radio link between UE and third BS (after RLF)
132 RLF indication message
140 user equipment (UE)
200 mobile radio communication network
210 first base station
210*a* first cell
220 second base station 220a second cell
250a area with signal strength of two neighboring base stations is similar (within 3 dB)
261 first street
262 second street
320 base station
326 handover control unit
327 data processing unit
328 transmitting unit

The invention claimed is:

1. A method for optimizing a handover behavior between at least a first base station and a second base station, the method comprising:
  receiving at the second base station a handover of a user equipment from the first base station;
  compiling at the second base station a handover report message comprising information about the performed handover, the handover report message indicating a radio property measured by the user equipment before, during and/or after the handover, wherein the radio property comprises location information of the user equipment and a Quality of Service class indicator;
  adding, by the second base station, at least some information obtained from a data record which has been associated with the user equipment before a radio connection between the user equipment and the second base station arising from the handover has been lost and which is still stored in the second base station, to the handover report message;
  forwarding the report message from the second base station to the first base station; and
  optimizing the handover behavior for subsequent handovers of other user equipments based on the indicated radio property and taking into account at least some of the added information.

2. The method as set forth in claim 1, wherein optimizing the handover behavior comprises:
  adapting a value of at least one handover radio threshold for triggering a subsequent handover of a different user equipment between at least the first and second base stations based at least in part on the indicated radio property; and/or
  adapting a value of at least one traffic steering parameter for changing distribution of a radio data load between different radio cells.

3. The method as set forth in claim 1, wherein the radio property is measured during and/or within a predetermined time period after the performed handover.

4. The method as set forth in claim 3, wherein the radio property measured by the user equipment is reported by the user equipment according to at least one measurement event which has been responsible for triggering the performed handover.

5. The method as set forth in claim 1, wherein the location information comprises Global Positioning System (GPS) coordinates.

6. The method as set forth in claim 1, wherein the first base station is assigned to a first radio access technology and the second base station is assigned to a second radio access technology, wherein the second radio access technology is different from the first radio access technology.

7. The method as set forth in claim 1, wherein a first radio link between the user equipment and the first base station is assigned to a first radio frequency and a second radio link between the user equipment and the second base station is assigned to a second radio frequency, wherein the second radio frequency is different from the first radio frequency.

8. The method as set forth in claim 1, further comprising:
  determining a value of a parameter being indicative for a quality of the performed handover; and
  including the indicated radio property in the report message only when the determined value is smaller than a predefined threshold value.

9. The method as set forth in claim 1, further comprising:
  losing a radio connection between the user equipment and the second base station; and
  receiving at the second base station from a third base station a Radio Link Failure indication message concerning a radio connection between the user equipment and the third base station,
  wherein the handover report message comprises at least some information from the radio link failure indication message.

10. The method as set forth in claim 9, wherein the third base station and the first base station are the same.

11. A base station comprising:
  a non-volatile memory storing a computer program;
  a processor, wherein the memory and the computer program are configured, with the processor to cause the base station to perform operations comprising:
  control a handover of a user equipment from another base station of the mobile radio communication network to the base station;
  compile a handover report message indicating a radio property measured by the user equipment before, during and/or after the handover, wherein the radio property comprises location information of the user equipment and a Quality of Service class indicator;
  add, by the second base station, at least some information obtained from a data record which has been associated with the user equipment before a radio connection between the user equipment and the second base station arising from the handover has been lost and which is still stored in the second base station, to the handover report message;
  forward the handover report message from the base station to the other base station; and
  based on the indicated radio property and taking into account at least some of the added information, optimize the handover behavior for subsequent handovers of other user equipments.

12. The base station as set forth in claim 11, wherein the base station is arranged for optimizing the handover behavior by at least one of:
  adapting a value of at least one handover radio threshold for triggering a subsequent handover of other user equipments between at least the first and second base stations based at least in part on the indicated radio property; and
  adapting a value of at least one traffic steering parameter for changing distribution of a radio data load between different radio cells.

13. The base station as set forth in claim 11, wherein the radio property is measured during and/or within a predetermined time period after the performed handover.

14. The base station as set forth in claim 11, wherein the location information comprises Global Positioning System (GPS) coordinates.

15. The base station as set forth in claim 11, wherein the other base station is assigned to a first radio access technology and the said base station is assigned to a second radio access technology, wherein the second radio access technology is different from the first radio access technology.

16. The base station as set forth in claim 11, wherein the memory and the computer program are further configured, with the processor to cause the base station to perform operations comprising:
- determine a value of a parameter being indicative for a quality of the performed handover; and
- include the indicated radio property in the report message only when the determined value is smaller than a predefined threshold value.

17. A computer program product for optimizing a handover behavior between a first base station and a second base station, the computer program product comprising a non-transitory computer-readable medium having a computer program thereon, the computer program configured to cause a processor of a base station to perform, in response to executing the computer program, operations comprising:
- receiving at the second base station a handover of a user equipment from the first base station;
- compiling at the second base station a handover report message comprising information about the performed handover, the handover report message indicating a radio property measured by the user equipment before, during and/or after the handover, wherein the radio property comprises location information of the user equipment and a Quality of Service class indicator;
- adding, by the second base station, at least some information obtained from a data record which has been associated with the user equipment before a radio connection between the user equipment and the second base station arising from the handover has been lost and which is still stored in the second base station, to the handover report message;
- forwarding the report message from the second base station to the first base station; and
- optimizing the handover behavior for subsequent handovers of other user equipments based on the indicated radio property and taking into account at least some of the added information.

* * * * *